(No Model.) 2 Sheets—Sheet 1.
G. DURYEE.
DREDGING MACHINE.
No. 471,108. Patented Mar. 22, 1892.
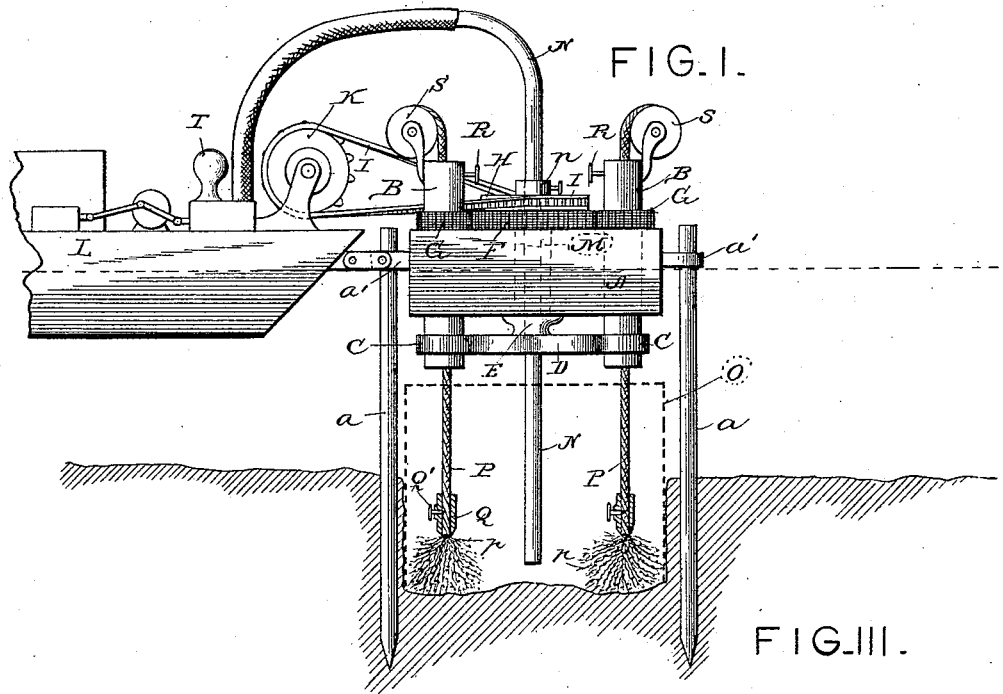
FIG. I.
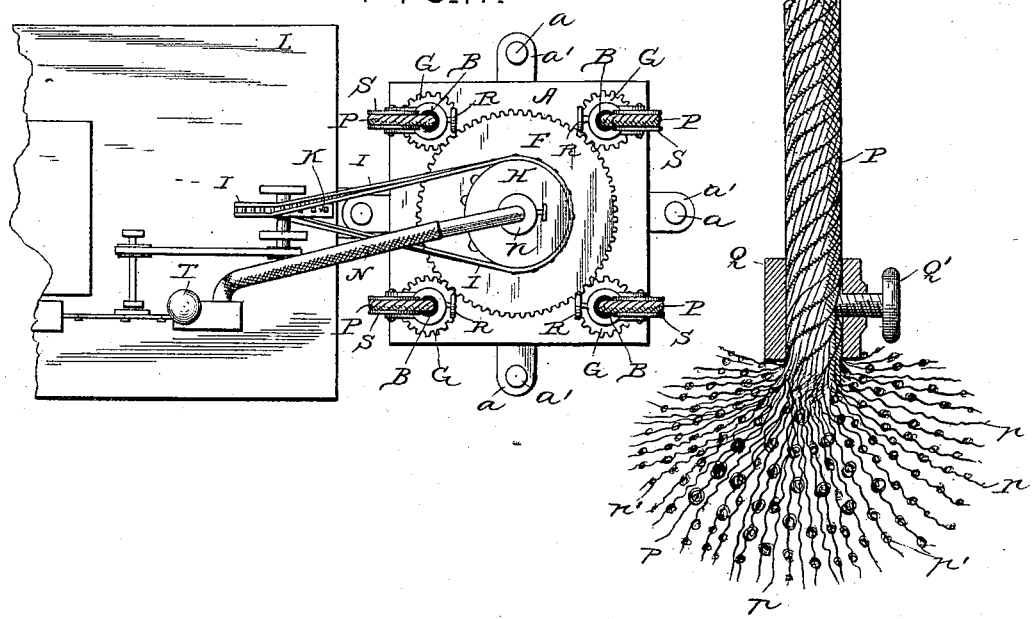
FIG. II. FIG. III.
Witnesses:
Harry S. Rohrer
F. A. Hopkins
Inventor:
George Duryee,
By Knight Bros.
Attorneys.
THE NORRIS PETERS CO., PHOTO-LITHO., WASHINGTON, D. C.

(No Model.)
2 Sheets—Sheet 2.
G. DURYEE.
DREDGING MACHINE.
No. 471,108.
Patented Mar. 22, 1892.
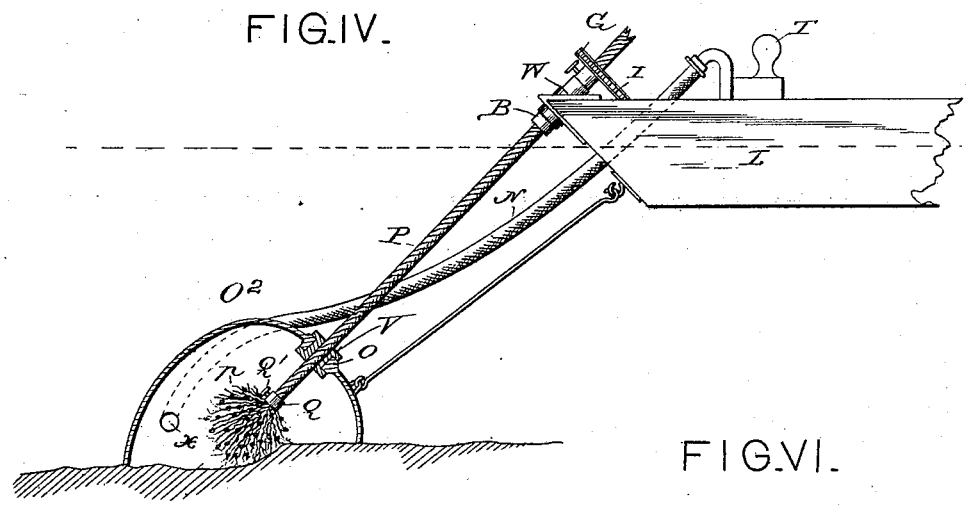
FIG. IV.
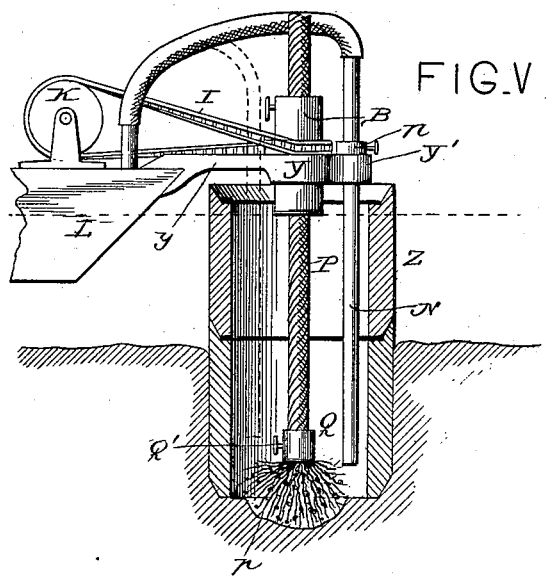
FIG. V.
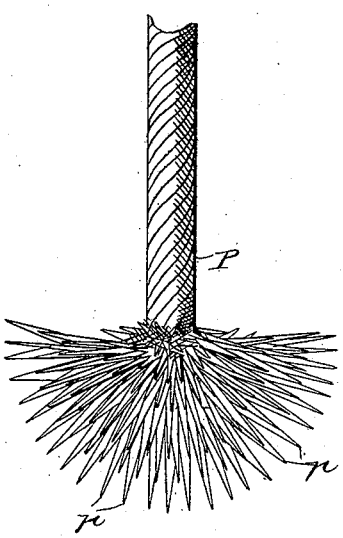
FIG. VI.
Witnesses:
Inventor:
George Duryee
By Knight Bros.
Attorneys.

UNITED STATES PATENT OFFICE.

GEORGE DURYEE, OF ORANGE, NEW JERSEY.

DREDGING-MACHINE.

SPECIFICATION forming part of Letters Patent No. 471,108, dated March 22, 1892.

Application filed June 9, 1891. Serial No. 395,653. (No model.)

*To all whom it may concern:*

Be it known that I, GEORGE DURYEE, a citizen of the United States, residing at Orange, in the county of Essex, State of New Jersey, have invented certain new and useful Improvements in Dredging-Machines, of which the following is a full, clear, and exact specification.

This invention relates to an apparatus for loosening marl, clay, sand, or other substances under water, so that the same may be removed by pumping or by other well-known methods of hydraulic excavating. It is a well-known fact that when centrifugal pumps, ejectors, or other suction-machines are employed for raising marl, clay, sand, or other like substances such machines are inactive on the substance to be raised while the latter remains in its natural solid or compact beds, however powerful the suction may be; but if the same substance is agitated and mixed or stirred up with water it will very readily pass unto the suction and be discharged.

More particularly my invention relates to that class of apparatuses employed for excavating the beds of rivers or other streams or bodies of water for the purpose, for instance, of deepening the channel or sinking foundations for bridge piers, abutments, &c.; and it has for its object the provision of simple and inexpensive means by which the substance to be excavated may be kept in a constant state of agitation and churned or stirred up with sufficient water to produce fluid or semi-fluid mud that may be drawn off through a pipe by means of any suitable suction device.

Broadly, my invention consists of an excavator having an agitator composed of a flexible shaft or stem from which project a number of agitating tines or cutters arranged in connection with any suitable float or support.

My invention also consists of certain other features of novelty hereinafter fully described in connection with the accompanying drawings and particularly pointed out in the claims.

Referring now to the said drawings, wherein like signs of reference refer to like parts throughout the several views, Figure I is a general side view of the apparatus constructed according to my invention. Fig. II is a plan view of the same. Fig. III is an enlarged detail view of one form of agitator or digger. Fig. IV is a side view, partly in section, of a trailing excavator hereinafter more fully described. Fig. V is a side view, partly in section, of an excavator for use in planting bridge piers, abutments, &c. Fig. VI is an enlarged detail view of a modified form of agitator or excavator.

A represents a floating frame or ponton, constructed of wood or metal in any suitable manner. Passing perpendicularly through this float are hollow shafts or tubes B, having suitable journal-bearings in the float near their upper ends, while their lower ends are journaled in and steadied by boxes or collars C, supported on radial arms D, the latter in turn being supported by a common central shank or hanger E, secured to the under side of the float. Of these shafts B any desired number may be employed; but I prefer to use four, as shown, which are evenly disposed around the perimeter of a large cog or gear wheel F and have formed thereon or otherwise secured thereto peripheral cogs or teeth G, which mesh with the gear F and are rotated thereby. This gear-wheel F has formed on or secured to its upper side a sprocket-wheel H of smaller diameter than the wheel F proper, with which engages a sprocket-chain belt I, passing around said sprocket-wheel and also around a sprocket-wheel K, mounted on the scow or barge L. The shaft M, upon which the wheel F is journaled, is preferably made hollow, so as to form a passage for the insertion of the suction or eduction pipe N, which projects through such hollow shaft and also through the hanger E down into the caisson O, (represented in dotted lines,) the hanger E also being hollow.

Passing through each of the hollow shafts or tubes B is a cable or wire rope, whose lower end is unraveled for a portion of its length and provided just above the unraveled portion with a sleeve or collar Q, securely clamped to the cable by means of a set-screw Q', so as to prevent further or unnecessary unraveling of the strands. The shafts B, preferably above the cogs or pinions G, are each provided with a set-screw R, adapted to tightly clamp the cable, thus preventing it from slipping downward and causing it to revolve with the shaft. Where the cables employed are too flexible to stand upright, their superfluous upper ends may be taken up on suitable spools or reels S, mounted upon the upper ends of the shafts B so as to be fed downward as the excavating proceeds. In order to prevent the unraveled strands of the cable, which constitute the agitating tines or diggers, from again twisting into the form of rope, I tie in each strand or tine $p$ a number of knots $p'$, (see Fig. III,) which also make the tines more effectual in loosening the mud or earth.

The wheel K is driven by any suitable means on the scow L, the float or ponton A being held in position by piles or stakes $a$, passing through collars $a'$ on the ponton and being driven into the river's bed.

The mud churned up by the agitators is drawn from the caisson O, which may be of any suitable construction, through the suction N by any suitable pump T, mounted on the scow. The suction-pipe N may be provided with an adjustable collar $n$, located above the sprocket-wheel H, so that the said pipe may be adjusted to the required depth in the caisson.

In Fig. IV I have shown an excavator adapted to be trailed or towed after a boat, so as to deepen the channel or other desired places while the scow or barge is in motion. The caisson $O^2$ in this instance is an inverted shell secured to the stern of the vessel or scow in any suitable manner and having in its upper side a journal-box $o$, in which rotates a sleeve V, secured to the cable or stem P of the digger or agitator. In this form the scow itself may constitute the float or ponton, and it is provided at its stern with a box W, set at an incline, and in which the hollow shaft or tube B, clamped to the cable, is journaled. The suction or eduction pipe N may be secured to the caisson in communication with an exit-port $x$, formed in the side thereof.

In the form for sinking bridge-abutments, &c., (shown in Fig. V,) I prefer to journal the shaft B in a box Y, carried by an arm or bracket $y$, supported on the scow or barge, and instead of a number of comparatively small cables I employ, preferably, but one stout cable or digger. The caisson Z is of any appropriate construction, it being preferable, however, to make it in sections bolted together and having water-tight joints. The suction-pipe N is supported by a supplemental box $y'$, formed on the side of the box $y$, or it may pass down from pump over the side of the caisson, as shown.

In the modified form of my flexible digger or agitator represented at Fig. VI, I form the digging-tines $p$ of steel blades or points, which are secured to the end of the cable by means of Babbitt metal molded around their bent ends and the end of the cable; or instead of the cable the stem of the digger may be composed of a moderately flexible steel rod. This form of agitator is especially adapted for use where it is necessary to work in clay bottoms or other hard tenacious beds.

With my flexible diggers or agitators I attain better result than is possible with the methods in which jets of steam or compressed air are used. The centrifugal force gives the lower end of the digger a large radial swing, thus stirring up a very large area of the bottom.

It will of course be understood that the tubes or shafts B are not absolutely necessary, as the cables might be secured to the pinions G and such shafts omitted.

If desired, the suction-pipe N may be simply lowered over the side of the ponton into the caisson, as shown in dotted lines in Fig. V.

Having thus described my invention, the following is what I claim as new therein and desire to secure by Letters Patent:

1. An excavator having a flexible cable-like digger provided with agitating-tines $p$, substantially as set forth.

2. An excavator having a digger consisting of a flexible cable-like revoluble stem or shaft having agitating-tines $p$, substantially as set forth.

3. The combination of the ponton or support, a cog or pinion mounted thereon, and a flexible cable-like digger or agitator secured to said cog, substantially as set forth.

4. The combination of the ponton, a hollow shaft journaled in said ponton and having a cog or pinion, and the flexible digger passing through and being clamped in said shaft, substantially as set forth.

5. The combination of the ponton having cogs or pinions mounted thereon, flexible diggers or agitators secured to and depending from said cogs, and a gear-wheel meshing with said cogs for revolving them, substantially as set forth.

6. The combination of the ponton, the flexible rotary diggers or agitators depending from said ponton, the suction-pipe, the caisson inclosing the ends of said diggers and from which said suction-pipe leads, and means for rotating said diggers, substantially as set forth.

7. The combination, with a ponton or support, of a digger consisting of a cable having at its lower end a number of agitating-tines, and means for operating said digger, substantially as set forth.

8. The combination, with a ponton or support, of a digger consisting of a cable having its strands unraveled for a portion of its length, so as to form agitating-tines, and means for operating said digger, substantially as set forth.

9. The combination, with a ponton or support, of a digger consisting of a cable having its strands unraveled for a portion of its length and the unraveled strands being knotted, and means for operating said digger, substantially as set forth.

10. The combination, with a ponton or support, of a digger consisting of a cable having its strands unraveled for a portion of its length, a band or sleeve arranged on the cable adjacent to the unraveled portion, and means for operating said digger, substantially as set forth.

11. The combination, with the ponton, of a gear-wheel mounted on said ponton, a number of tubular shafts journaled in said ponton around said gear-wheel and having peripheral cogs or pinions meshing with said gear-wheel, spools or reels supported on said shafts, cables wound on said spools and projecting through said shafts, and an engine geared to said gear-wheel, substantially as set forth.

GEORGE DURYEE.

Witnesses:
J. B. CONKLING,
RICH. MCMANUS.